United States Patent [19]
Bailey et al.

[11] Patent Number: 5,364,489
[45] Date of Patent: Nov. 15, 1994

[54] APPARATUS FOR APPLYING ADHESIVE TO AN OPTICAL FIBER DURING WINDING

[75] Inventors: Wilbur M. Bailey; George H. Hulderman; Daniel K. Schotter, all of Tucson, Ariz.

[73] Assignee: Hughes Aircraft Company, Los Angeles, Calif.

[21] Appl. No.: 46,347

[22] Filed: Apr. 8, 1993

Related U.S. Application Data

[63] Continuation of Ser. No. 789,491, Nov. 8, 1991, abandoned, which is a continuation of Ser. No. 413,360, Sep. 27, 1989, abandoned.

[51] Int. Cl.$^5$ ............................................. B65H 81/06
[52] U.S. Cl. ..................................... 156/356; 156/173; 156/175; 156/169; 156/379; 156/425; 156/441; 156/429; 242/173; 242/159; 244/3.12
[58] Field of Search ............... 156/362, 433, 446, 578, 156/50, 161, 169, 172, 173, 175, 356, 379, 425, 441, 428, 429; 242/173, 159; 244/3.12; 118/229, 232, 235; 427/177, 178, 163

[56] References Cited

U.S. PATENT DOCUMENTS

| 2,639,097 | 5/1953 | Scott, Jr. | 242/173 |
| 2,732,817 | 1/1956 | Robinson | 242/173 |
| 4,276,335 | 6/1981 | Cobean | 156/433 |

FOREIGN PATENT DOCUMENTS

| 25327 | 2/1931 | Australia | 242/173 |
| WO90/05929 | 5/1990 | WIPO . | |

Primary Examiner—Michael W. Ball
Assistant Examiner—Francis J. Lorin
Attorney, Agent, or Firm—Randall M. Heald; Charles D. Brown; Wanda K. Denson-Low

[57] ABSTRACT

In-line application of liquid adhesive to an optical fiber (10) while it is being wound onto a drum (14) is accomplished by a tube (58) interconnected with a pressurized adhesive source of supply (70). An end (60) of the tube provides adhesive in a beadlike strip which wets the drum or underlying winding layer just under the fiber lower surface before it is laid down onto the drum.

14 Claims, 1 Drawing Sheet

APPARATUS FOR APPLYING ADHESIVE TO AN OPTICAL FIBER DURING WINDING

RELATED APPLICATIONS

The present application is a continuation of application Ser. No. 07/789,491 filed Nov. 8, 1991 and now abandoned application Ser. No. 07/789,491 is itself a continuation of application Ser. No. 07/413,360 filed Sep. 27, 1989 and now abandoned.

BACKGROUND OF THE INVENTION

1. Field of the Invention

The present invention broadly concerns winding an optical fiber to form a filament pack, and, more particularly, to applying adhesive to the optical fiber during winding.

2. Description of Related Art

Optical fibers and wire filaments as well, have been utilized in missiles and other airborne vehicles as a data link to interconnect onboard apparatus with launch site apparatus. In use, the optical fiber which is wound onto a canister and located aboard the vehicle has one end connected to on board electrical apparatus and the other end which extends from the vehicle connects with control apparatus at the launch site. After launch, the optical fiber unwinds from the on-board canister maintaining the data link with the launch site.

In order to insure geometric integrity and stability of the wound pack during remote storage and while on the vehicle prior to launch, it has been standard practice to apply an adhesive to the fiber either during winding or after the pack is formed. Examples of known adhesive application methods include spraying the adhesive over each layer of fiber as it was laid down, or, alternatively, applying the adhesive by the use of a syringe applicator having a closed needle-like die. There are inherent problems in spraying which results in inconsistent and non-uniform coverage as well as being relatively time consuming to employ. The syringe approach, also, although providing a more uniformly thick and consistent coating and being quicker than spraying, since it requires the fiber passing through a tube or syringe is difficult to use and necessitates the fiber being completely pulled through the applicator or being broken if the adhesive application must be interrupted or terminated ahead of time.

A substantial proportion of the overall cost of an optical fiber canister is attributable to merely winding the fiber onto the canister. Accordingly, it is advisable to be able to apply the adhesive in-line with the actual winding process so as to reduce winding costs overall.

It is, therefore, desirable to be able to provide a fully reliable adhesive coating to the fiber during winding and in such a manner as to be able to easily remove the fiber from the applicator in order to correct possible winding anomalies without having to completely dismantle the adhesive applying apparatus or break the fiber.

SUMMARY OF THE INVENTION

A guide pulley having a grooved circumferential surface engages an optical fiber being taken off a storage spool and closely positions the fiber for winding onto a canister drum or any other similar rotatable support. The guide pulley is mounted onto apparatus for moving it along predetermined paths both parallel to the canister drum axis as well as vertically from the drum surface to accommodate buildup of winding layers. On the same traversing apparatus, there is provided a very fine open ended tube similar to a hypodermic syringe needle, for example, which is located just underneath and closely spaced to the underside of an optical fiber just prior to its being wound onto the canister drum. A supply of pressurized liquid adhesive passes through the tube forming a continuous supply of adhesive at its outer end which is deposited onto the drum or underlying layer, as the case may be, just under where a new winding is being applied so that the new winding will rest in an adhesively wetted area. The pressure of the adhesive is maintained such that the fiber being wound onto the drum is continuously wetted on its lower surface and in that way serves to lubricate the fiber making it easier to wind upon the canister drum, and as well provide the fiber with adhesive which sets up to form a unitary wound pack that will maintain its geometry during storage and withstand the normal vibrations and shocks encountered during pre-launch use.

DESCRIPTION OF A PREFERRED EMBODIMENT

Figure 1:
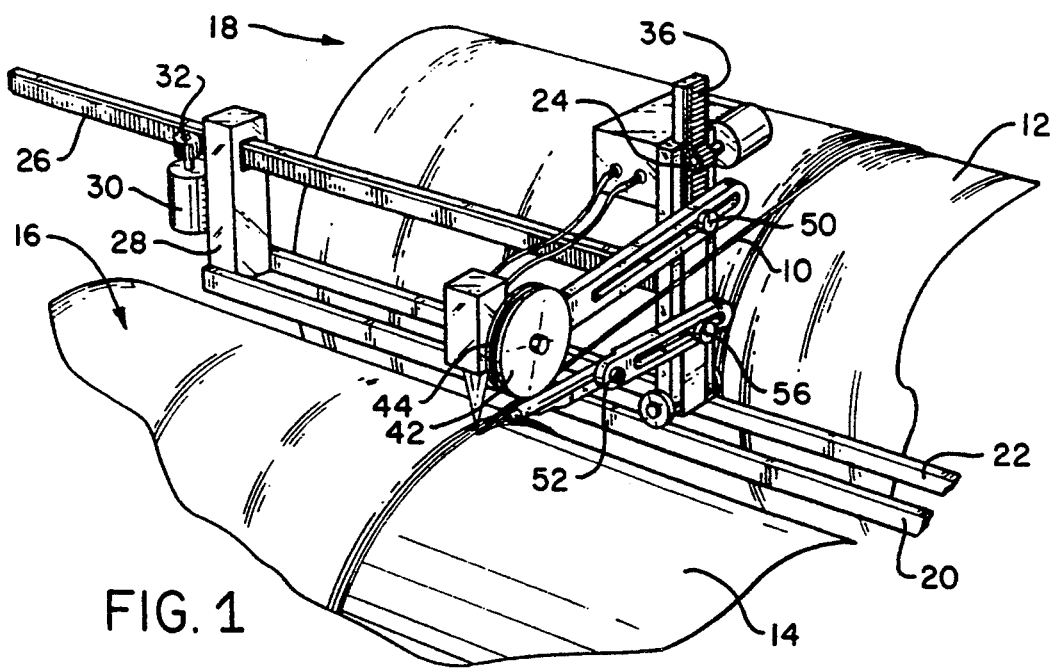
FIG. 1 is a perspective view of a first embodiment of an apparatus constructed in accordance with the invention showing winding of a canister with an optical fiber.
Figure 2:
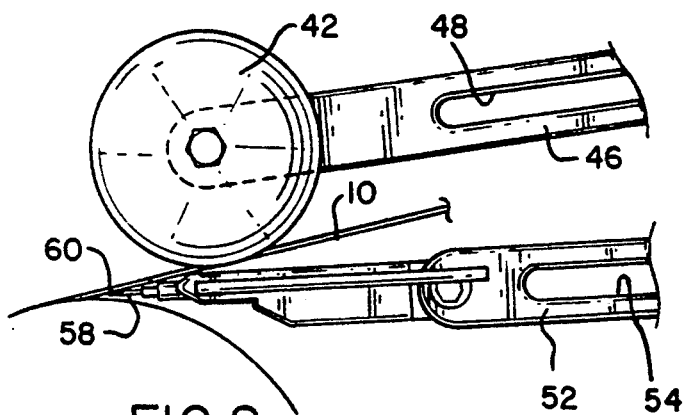
FIG. 2 is a side elevational view of the apparatus of FIG. 1.
Figure 3:
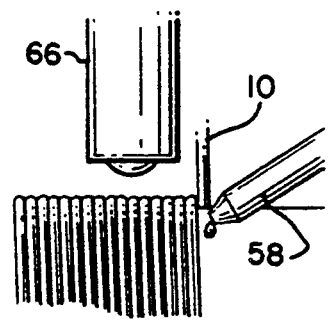
FIG. 3 is an elevational, slightly enlarged, partially fragmentary view showing application of adhesive in accordance with the method of this invention.

Turning now to the drawings and particularly FIG. 1, an optical fiber 10 is shown being removed from a storage spool 12 and wound onto a cylindrical canister or drum 14 for ultimate use as a missile or vehicle data link, for example. Since the wound drum 14 may have to be stored for some time, either aboard the vehicle, or at some suitable storage facility, it is customary practice to apply an adhesive to the wound pack 16 which acts to maintain the dimensional and geometric integrity of the stack. As will be more particularly described, the apparatus identified generally as 18 applies a liquid adhesive onto the fiber at the point that it is being laid down onto the drum surface or onto an underlying fiber layer on the drum, as the case may be.

The apparatus 18 for practicing the method of this invention includes a pair of elongated support rails 20 and 22 located between the storage spool 12 and drum 14, and extending generally parallel to the cylindrical axis of the canister drum. A vertically extending guide 24 has one end mounted onto a pair of rollers which are constructed of such geometry and dimensions as to enable receipt on the upper surfaces of the rails 20 and 22 and to roll therealong. A rack 26 has one end secured to the guide 24 and the remainder of which extends through an oversized opening in a vertically extending stanchion 28 end mounted to the rails 20 and 22. A servomotor 30 is affixed to the stanchion 28 and includes a drive gear 32 which meshes with teeth on the rack 26 for positioning the rack at any desired location horizontally along the rails 20 and 22, as will be more particularly described. Since the axis of the canister 14 is more frequently than not arranged horizontally during winding, the motor 30 will be referred to herein as the horizontal motor.

The guide 24 also includes a central slot 34 through which a further rack 36 is slidingly received. A servomotor 38 is secured to the upper end of the guide and has a drive gear 40 which meshes with the rack 36 for drivingly positioning the rack at any desired vertical position along the guide 24.

A pulley wheel 42 having a circumferential groove 44 is axially and rotatably mounted to the end of a support arm 46. An elongated slot 48 in arm 46 has a threaded member 50 enabling removable attachment of the arm to the rack 36. By virtue of the elongated slot, the arm 46 may be located at any desired angular position and spacing from the guide 24 by loosening and retightening the threaded member 50. In operation, the pulley wheel grooves 44 receives the fiber 10 therein and precisely locates the fiber during winding onto the drum 14 in a manner that will be more particularly described.

A further arm 52 has an elongated slot 54 therein similarly secured to the rack 36 below the first elongated arm 46 and adjustably secured to the rack by a threaded bolt 56. Secured to the outer end of the arm 52 is a hollow tube 58 with its longitudinal axis generally aligned to that of the arm 52, the tube opening having a cross-section in the order of 0.010 inches diameter. The tube is interconnected with a source of supply of liquid adhesive (not shown) maintaining a continuous supply at the tube outer end 60. More particularly, the adhesive volume being applied underneath a new winding is a function of the linear winding velocity.

Figure 4:
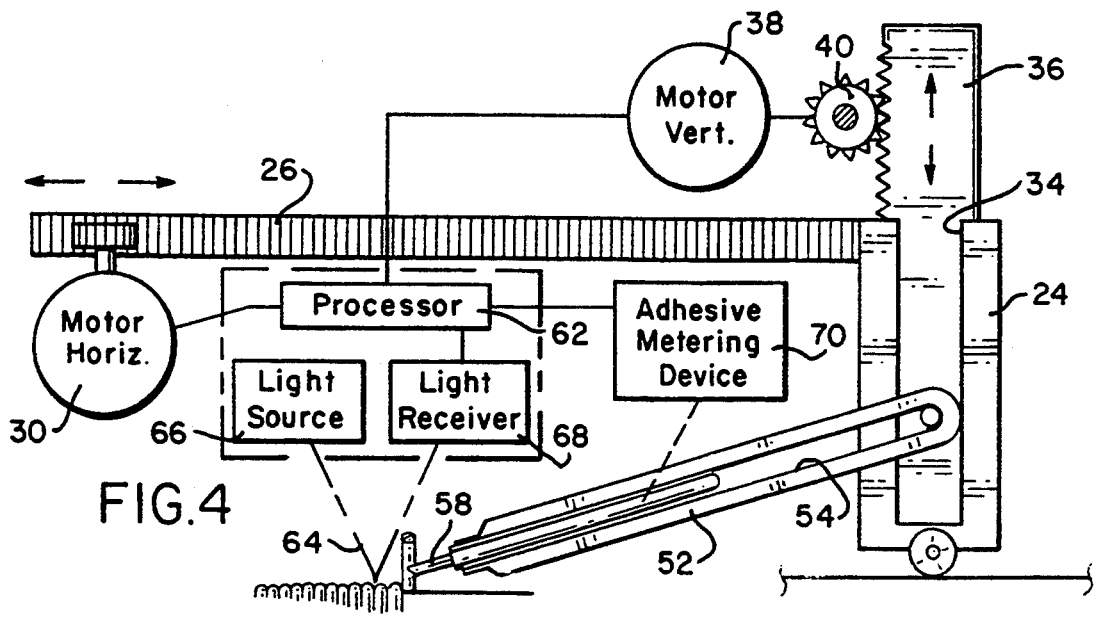
FIG. 4 is a schematic view of a second embodiment of an apparatus constructed in accordance with the invention and electrical control circuitry therefor.

With particular reference to FIG. 4, it is seen that the servomotor operation is under control of a processor 62 responsive to a light beam reflected from the upper surface of the pack 16 and/or drum surface. More particularly, a light beam 64 from a source 66 is directed toward the upper surface of a fiber (or, optionally, a groove between adjacent fibers) which reflects to a light detector 68 where a signal is generated that is entered into the processor 62. The processor generates drive signals for both the horizontal and vertical motors effecting both proper tracking of the winding in the current layer and raising the winding apparatus to accommodate the addition of layers. In addition, the processor controls an adhesive metering device 70 such that adhesive is continuously provided to the tube 58 in accordance with winding speed so that a very small amount of adhesive will be laid down underneath a new winding onto the drum or underlying winding, as the case may be. Winding a fiber onto a wet bead of adhesive also provides lubricity aiding uniform placement of the fiber. In initially setting up the equipment, the operator may have to make manual adjustments to optimize adhesive application rate for current operating circumstances (e.g. canister configuration, relative humidity, adhesive used).

In practicing the method of this invention by the disclosed apparatus, the horizontal rack 26 is positioned at one end of the drum 14 and the vertical rack 36 is adjusted to the position for winding the first (lowermost) layer. A length of fiber 10 pulled off the storage spool has its end anchored to the drum and the fiber is threaded along the pulley groove. With apparatus calibrated as required for current conditions, winding is begun which consists essentially of the fiber being placed at a precise location on the drum by the pulley wheel 42 under the control of the horizontal servomotor which incrementally moves the pulley wheel longitudinally of the-drum. At the same time, adhesive is metered from the tube 58 onto the drum surface (or fiber layer) immediately under the fiber leaving the pulley wheel. Winding in this way continues to finish a winding layer when the vertical servomotor moves the pulley and adhesive tube radially outward for a new layer, and a new winding is laid down in reverse direction.

In accordance with the method of this invention as performed by the described apparatus, a continuous narrow strip or bead of adhesive is deposited onto the drum or underlying winding layer just as a new winding is about to be laid down. The strip or bead has a width approximately the same as that of the filament.

Although the present invention is described in connection with a preferred embodiment, it is to be understood that those skilled in the appertaining art could utilize modifications without departing from the spirit of the invention as described herein and defined in the appended claims. For example, as described, the dispensing apparatus and pulley 42 are moved horizontally and vertically while the drum 14 is stationary. However, it is contemplated that the dispensing apparatus and pulley can be held stationary and the drum moved horizontally and vertically the required amount with equally advantageous results.

What is claimed is:

1. Apparatus for applying a liquid adhesive only between adjacently disposed layers of a filament pack formed by winding an optical fiber onto a drum from a storage spool, comprising:
   a support drum;
   a frame assembly positioned adjacent the drum and movable along a path extending parallel to a longitudinal axis through the drum;
   a pulley wheel guiding an optical fiber to a precise location on the drum;
   means extending from the frame for moveably supporting said pulley wheel relative to the drum;
   a hollow tube having a first end facing the drum and located between the optical fiber and the drum at a point after the fiber has engaged the pulley wheel and before the fiber is wound onto the drum;
   means extending from the frame for moveably supporting said hollow tube relative to the drum; and
   a source Of pressurized liquid adhesive connected to a second end of the tube, providing a minimal amount of adhesive from the hollow tube to continuously wet only a layer of optical fiber previously wound about the drum, thereby only creating a releasable bond between the previously wound layer and a succeeding layer of the filament pack.

2. Apparatus as in claim 1, in which the pulley wheel has a circumferential groove within which the fiber is received.

3. Apparatus as in claim 1, in which the tube and pulley wheel are adjustably positionable with respect to each other.

4. Apparatus as in claim 1, in which means interconnect the tube and pressurized adhesive source for supplying adhesive in a continuous beadlike strip from the tube end.

5. Apparatus as in claim 4, in which the strip is of a width approximately equal to that of the fiber.

6. Apparatus as in claim 1, further including motor means engaging said frame assembly for repositioning said pulley wheel and said hollow tube along the longitudinal axis of the drum, thereby compensating for movement of the fiber along the longitudinal axis of the drum as it winds onto the drum.

7. Apparatus as in claim 6, further including control means for automatically actuating said motor means, thereby repositioning said pulley wheel and said hollow tube relative to the drum.

8. Apparatus as in claim 1, in which said end of said hollow tube defines an opening having a cross-section of substantially 0.010 inches diameter.

9. The apparatus of claim 1, further including
means for controlling the flow rate of the adhesive from the source of pressurized liquid adhesive responsive to the movement of the drum.

10. The apparatus of claim 1, further including
means for monitoring the winding speed of the drum; and
means for metering the flow of adhesive from the source of pressurized liquid adhesive responsive to the means for monitoring.

11. The apparatus of claim 1, further including
means for directing a light beam against the optical fiber wound onto the drum;
means for measuring a reflected light beam resulting from the light beam directed against the optical fiber by the means for directing; and
means for metering the flow of adhesive from the source of pressurized liquid adhesive responsive to the means for measuring.

12. An apparatus for applying liquid adhesive only between adjacently disposed layers of a filament pack formed by winding an optical fiber onto a support drum, comprising:
a support drum;
guide means located proximate the drum for guiding an optical fiber into its precise position on the drum;
means for moving and positioning the guide means relative to the drum;
tubular dispenser means located between the guide means and the drum for providing a minimum amount of liquid adhesive onto each layer only after the layer is wound onto the drum, thereby creating a filament pack wherein each layer is releasably adhesively bonded to adjacently disposed layers located on radially opposite sides of the layer;
a source of pressurized liquid adhesive connected to the dispenser means; and
means for controlling the flow rate of adhesive from the dispenser means responsive to the movement of the drum.

13. The apparatus of claim 12, wherein the means for controlling includes means for monitoring the winding speed of the support drum.

14. The apparatus of claim 13, wherein the means for monitoring includes
means for directing a light beam against the optical fiber wound onto the drum; and
means for measuring a reflected light beam resulting from the light beam directed against the optical fiber by the means for directing.

* * * * *